Figures 1, 2, 3:
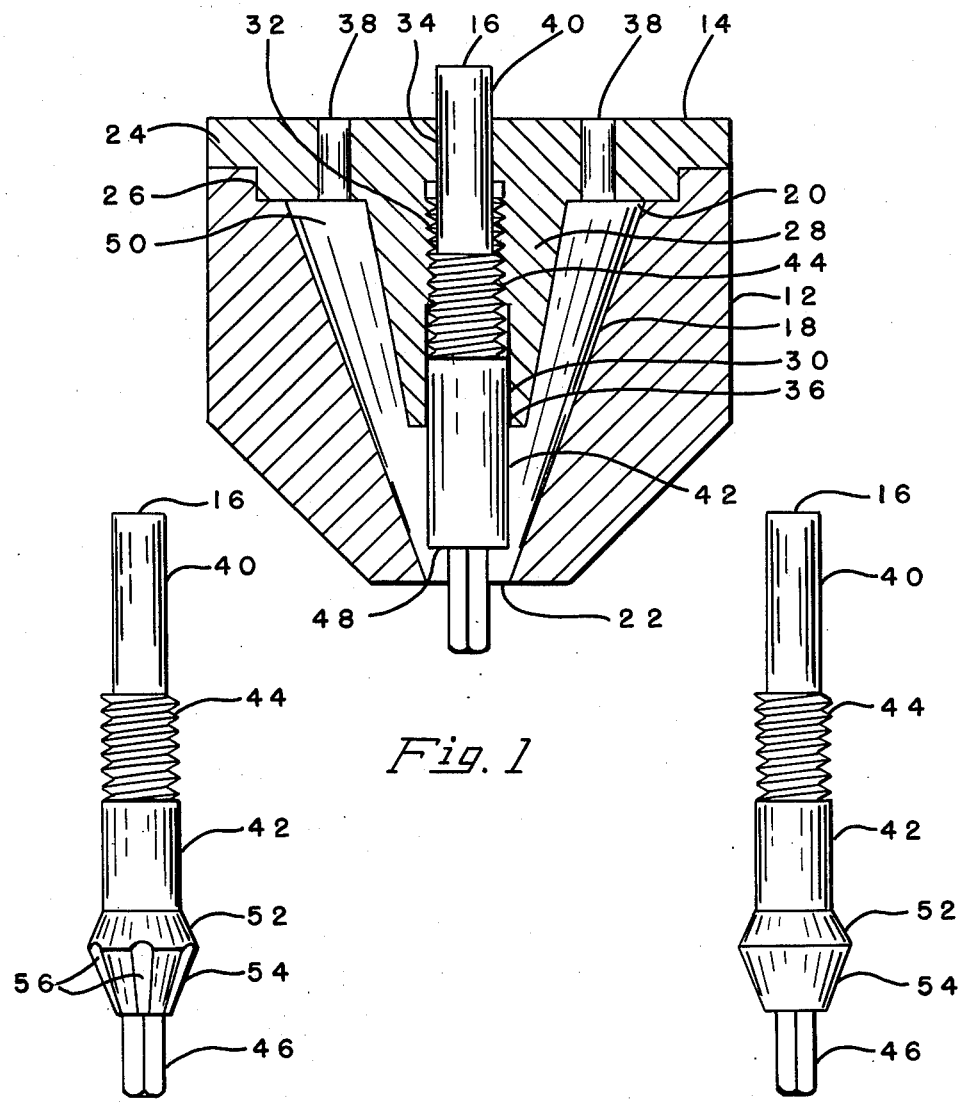

Dec. 24, 1957     M. FREIFELD ET AL     2,817,115

NOZZLE FOR INJECTION MOLDING

Filed March 28, 1955

MILTON FREIFELD
ROLLIN D. KEENEY    INVENTORS

BY

Robert M. Dickey    ATTORNEY

United States Patent Office 2,817,115
Patented Dec. 24, 1957

2,817,115

NOZZLE FOR INJECTION MOLDING

Milton Freifeld, Springfield, and Rollin D. Keeney, Ludlow, Mass., assignors to Monsanto Chemical Company, St. Louis, Mo., a corporation of Delaware Application March 28, 1955, Serial No. 497,062

3 Claims. (Cl. 18—30)

This invention relates to nozzles for injection molding machines. More particularly the invention relates to nozzles for injection molding machines having an easily adjustable material chamber in the nozzle.

Injection molding is widely used for preparing articles from thermoplastic materials. As long as the plastic materials are of substantially the same composition and as long as they are stable materials, no particular problems arise in adjusting the injection molding machine from run to run. However, when it is desired to use a variety of plastics or a variety of formulations of the same plastic or where it is desired to use a plastic which is subject to thermal decomposition unless conditions are carefully controlled, it is necessary to adjust the molding machine for each material or formulation. Hitherto this has involved dismantling the machine and changing the dispersion nozzle.

One object of this invention is to provide new dispersion nozzles for injection molding machines.

A further object is to provide injection molding nozzles having an easily adjustable material chamber.

These and other objects are attained as described below and illustrated in the drawings in which Fig. 1 is a sectional view, partly in elevation, of an assembled injection molding nozzle and Figs. 2 and 3 are sectional views of specific embodiments of the adjustable feature of the invention.

Referring now to the figures and particularly to Fig. 1, there is shown a cross-sectional view of an assembled nozzle made according to this invention. The nozzle consists of a casing 12, an insert 14 and a shaft 16.

The casing is of such size and shape as to be adaptable to be mounted in the forward end of an injection molding machine behind the backing plate. The casing contains a frustoconical inner wall 18 the large diameter of which defines the inlet port 20 and the small diameter of which defines the exit port 22, said exit port cooperating with the sprue of an injection molding die, not shown.

The insert 14 is adapted to be mounted in a fixed position on the rear end of casing 12 by means of a shoulder 24 nesting in recess 26 of the casing. The main body 28 of the insert 14 extends forward into casing 12 and partially fills same to form a channel or material chamber 50 defined by inner wall 18 and outer wall of body 28. The insert 14 contains a circular bore 30 partially internally threaded as at 32. The walls of the circular bore 30 are smooth at the rear end 34 and at the forward end 36 thereof. In addition, insert 14 has a plurality of openings 38 in the rear portion thereof to permit flow of plastic into channel 50.

Adjustably mounted in bore 30 is shaft 16. The shaft comprises a round solid rod having a smooth wall at 40 dimensioned to provide a turning fit with wall 34 of bore 30. Shaft 16 also has a smooth wall surface 42 dimensioned to provide a turning fit with wall 36 of bore 30. Intermediate between smooth wall sections 40 and 42, the shaft 16 is externally threaded at 44 so that these threads cooperate with threads 32 of bore 30.

Smooth wall surface 42 is sufficiently long to extend forward to the exit port 22 of channel 50 when threads 32 and 44 are only partially engaged. The forward end of shaft 16 is provided with a means for turning said shaft for adjusting the shaft to or from the exit port 22 by means of the threaded portion 44. This turning means may be a slot extending across the end face of said shaft, an eccentric hole extending from the end face of said shaft a short distance inward, both not shown, or an extension of the shaft as shown at 46 said extension being small enough not to impede flow of the plastic material through the sprue of the injection molding die.

In actual operation, the nozzle is assembled by seating insert 14 in shoulders 26 of casing 12 and adjusting shaft 16 in insert 14 so that the forward end 48 of shaft 16 is positioned rearwardly of exit port 22. The assembled nozzle is then inserted in an injection molding machine so that the rear surface of insert 14 is tightly locked against the body, not shown, of the machine. The die backing plate and die, both not shown, are then mounted in front of the assembled nozzle with the sprue thereof in cooperating alignment with exit port 22 of channel 50. When so positioned the surfaces of the insert 14 and the shaft 16 together cooperate with the inner surface 18 of casing 12 to define the channel or material chamber 50 through which the plastic material flows on the way to the die. The injection molding machine is then started with a standard molding cycle. If it is found that the flow through exit port 22 is too great, the backing plate carrying the die is removed and shaft 16 is adjusted by turning means 46 to bring the forward end of shaft 16 closer to port 22 thus restricting the flow through port 22. If the flow is too small the adjustment is in a direction away from port 22. Since most injection molding machines are adapted to remove the backing plate and die away from the machine by the simple movement of a lever, this adjustment of shaft 16 is easily and quickly made.

The shape of insert 14 should conform to certain general principles. Thus the head carrying bearing shoulders 24 should be of substantial dimensions to withstand the pressures developed within the machines. The openings 38 may be of any suitable size and dimensions with the qualification that their total cross-section area is large enough to permit complete filling of the nozzle in normal operations and yet not so great as to seriously weaken the strength of the insert.

The main body 28 of the insert normally will be conical in shape but the sides thereof are not necessarily parallel to the walls 18. Other shapes may be used such as oval or elliptical shapes but conical walls are preferred due to the nature of plastic flow in such an apparatus. The main body 28 should extend a substantial distance into channel 50 towards exit port 22, i. e. at least 30% and preferably at least 50% of said distance.

The shape of shaft 16 may be varied in many ways. It is essential for cleanliness and maintenance purposes that surfaces 40 and 42 be dimensioned to provide a turning fit with smooth ends 34 and 36 of bore 30 in insert 14. The length of the wall surfaces 40 and 42 should be sufficient so that at any adjustment of the shaft, bore 30 will be tightly closed to prevent flow of plastic therein.

The forward end of shaft 16 may be of any desired shape. It may be straight as shown in Fig. 1, it may be tapered to approach or equal the taper of the wall 18, or it may have a double taper as shown at 52 and 54 in Figs. 2 and 3. In addition the walls of the lower end of the shaft may be fluted as at 56 in Fig. 3 with straight or spiral flutes which may be continuous or interrupted.

The foregoing description is illustrative of this invention and it is obvious that many variations may be made within the spirit and scope thereof.

What is claimed is:

1. In an injection molding machine, a nozzle comprising a casing, an insert and a shaft, said casing having a frustroconical inner surface running longitudinally therethrough, the large diameter end of said surface defining the inlet port of said nozzle and the small diameter end of said surface defining the exit port of said nozzle, said insert being adapted to be immovably mounted at the inlet end of said casing and extending into said casing, said insert containing a circular bore carrying female threads, said shaft carrying male threads, corresponding to said female threads, said male and female threads together cooperating to permit adjustment of said shaft within said insert, said shaft extending from the insert towards the exit port of said casing, the end of said shaft substantially conforming to the shape of said casing at the exit port thereof and means for turning said shaft in order to regulate the longitudinal position of said shaft within said casing, said insert and shaft together in cooperation with the inner surface of said casing defining an adjustable material chamber within said casing.

2. A nozzle as in claim 1 wherein the forward end of the shaft is in the form of a double taper.

3. A nozzle as in claim 1 wherein the forward end of the shaft is fluted.

References Cited in the file of this patent

UNITED STATES PATENTS

| 1,768,671 | Devine | July 1, 1930 |
| 2,616,126 | Merck et al. | Nov. 4, 1952 |

FOREIGN PATENTS

| 603,903 | Great Britain | June 24, 1948 |